United States Patent [19]

Welch et al.

[11] Patent Number: 4,811,569
[45] Date of Patent: Mar. 14, 1989

[54] ZERO CUBE TRANSPORT REFRIGERATION UNIT FOR STRAIGHT TRUCKS

[75] Inventors: Dennis E. Welch, St. Paul; William L. Waldschmidt, Farmington, both of Minn.

[73] Assignee: Thermo King Corporation, Minneapolis, Minn.

[21] Appl. No.: 197,177

[22] Filed: May 23, 1988

[51] Int. Cl.⁴ .............................................. B60H 1/32
[52] U.S. Cl. ..................................... 62/239; 62/373.1
[58] Field of Search ...................... 62/239, 323.1, 243

[56] References Cited

U.S. PATENT DOCUMENTS

| | | | |
|---|---|---|---|
| 2,263,476 | 11/1941 | Sunday | 62/239 X |
| 2,869,333 | 1/1959 | Horby et al. | 62/239 |
| 3,421,340 | 1/1969 | Von Berg | 62/239 |
| 4,402,191 | 9/1983 | King | 62/239 |
| 4,736,597 | 4/1988 | Anderson et al. | 62/239 |
| 4,748,824 | 6/1988 | Wakabayashi et al. | 62/239 |

FOREIGN PATENT DOCUMENTS 743888  1/1956  United Kingdom ............... 62/323.1

Primary Examiner—William E. Tapolcai
Attorney, Agent, or Firm—D. R. Lackey

[57] ABSTRACT

A zero cube transport refrigeration unit suitable for a straight truck having a component arrangement which minimizes the height of the unit to provide maximum clearance for tilt cabs, and an air flow arrangement which discharges all noise generated by an internal combustion engine vertically upward from the top of the unit. Prime mover, evaporator, compressor and comdenser sections are laterally spaced from one side of the unit to the other, and a single power shaft runs through all of the sections. Evaporator and condenser air movers are directly mounted on the power shaft while the internal combustion engine, compressor, and optional electric standby motor, are all belted to the power shaft. The evaporator air mover is a centrifugal blower wheel, which provides excellent air distribution in the load space of a straight truck. All air is brought into the unit from one side thereof via the condenser section and discharged upwardly through openings in the top of the unit, with the cover and frame cooperatively defining an air flow passageway from the compressor section to the prime mover section, to isolate the prime mover section for minimal external noise.

12 Claims, 3 Drawing Sheets

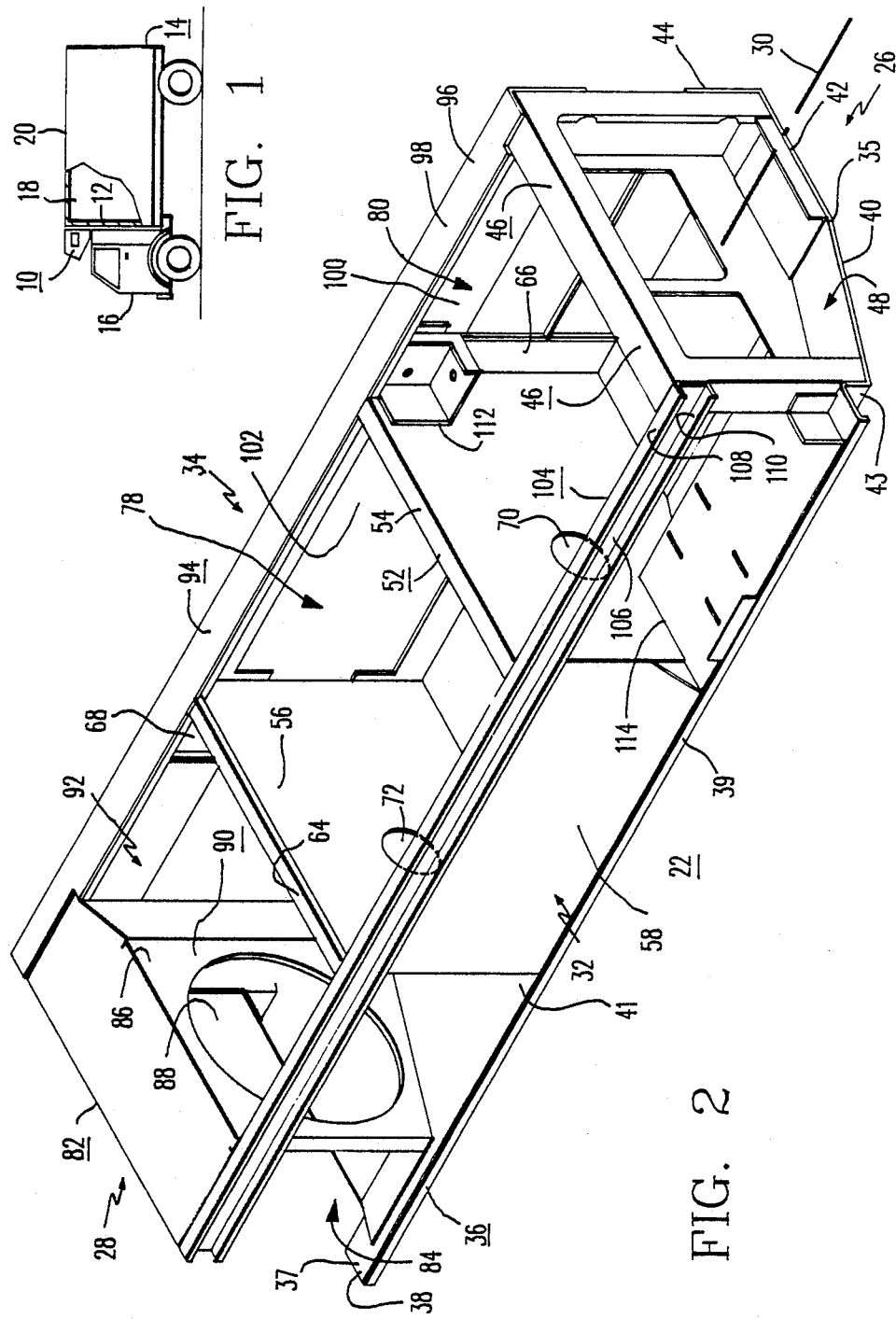

1

ZERO CUBE TRANSPORT REFRIGERATION UNIT FOR STRAIGHT TRUCKS

TECHNICAL FIELD

The invention relates to transport refrigeration units, and more specifically to zero cube transport refrigeration units for straight trucks.

BACKGROUND ART

Transport refrigeration systems for straight trucks are often mounted through the front wall of the truck body. Tilt cab clearance is usually not a problem when the refrigerant compressor is in the truck engine compartment, and driven by the truck engine, as the refrigeration package mounted on the truck wall can easily be made small and compact. When a Diesel engine and compressor are added to the refrigeration package to make a self contained unit, however, it presents a challenge in coordinating and mounting the various refrigeration components on a frame to minimize the height of the refrigeration unit. Adding an optional standby electrical drive motor to the unit package, and the requirement that the unit intrusion into the truck cargo space be essentially zero, called "zero cube", additionally complicates the problem.

It is the object of the present invention is to provide a component layout for a completely self contained transport refrigeration unit suitable for a straight truck which, although it includes an evaporator, condenser, compressor and a prime mover, has a height dimension which will reduce or eliminate the need to increase truck body height to accommodate tilt cab clearance. It is a further object of the invention to locate the refrigerant evaporator within the frame of the transport refrigeration unit, with zero intrusion into truck cargo space, to provide a zero cube unit, notwithstanding that the prime mover includes an internal combustion engine and an optional electrical standby motor. It is an object of the invention to provide a zero cube unit having an evaporator air flow arrangement which promotes good air circulation through the cargo space of the associated truck. It is also an object of the invention to reduce the street level noise generated by the internal combustion engine.

DISCLOSURE OF THE INVENTION

With the above mentioned objects in view, the present invention resides in a zero cube transport refrigeration unit for straight trucks which includes an elongated metallic frame which laterally defines control, prime mover, evaporator, compressor and condenser sections, disposed in the recited order from one end of the frame to the other. An internal combustion engine is disposed in the prime mover section, an evaporator is disposed within said evaporator section in a manner which provides zero intrusion into the truck cargo space, a compressor in disposed in the compressor section, and a condenser is disposed in the condenser section. A single power shaft, common to all of said sections, extends from the prime mover section to the condenser section, through the evaporator and compressor sections. Air movers for moving air through the condenser and evaporator are directly mounted on the power shaft. The prime movers and compressor are all coupled to the power shaft via belts and pulleys.

Air is brought in from one side of the unit, through the condenser and an engine radiator, and it is directed in a first path through the compressor section and upwardly through an opening in the top of the unit. The frame and cover of the unit cooperatively define an air flow passageway past the evaporator section to the prime mover section, to cool the prime movers, i.e., an internal combustion engine and an optional electrical standby motor, enabling the prime mover section to be closed except for an air discharge opening in the top of the unit. Thus, noise generated by the condenser fan, and noise generated by the internal combustion engine, are both discharged vertically upward along with the discharge air, minimizing street level noise.

BRIEF DESCRIPTION OF THE DRAWINGS

The invention will become more readily apparent from the following description of preferred embodiments thereof shown by way of example only, in the accompanying drawings, in which:

FIG. 1 is an elevational view of a straight truck having a transport refrigeration unit constructed according to the teachings of the invention;

FIG. 2 is a perspective view of a metallic frame which may be utilized by the transport refrigeration unit of FIG. 1;

DESCRIPTION OF PREFERRED EMBODIMENTS

Figure 3:
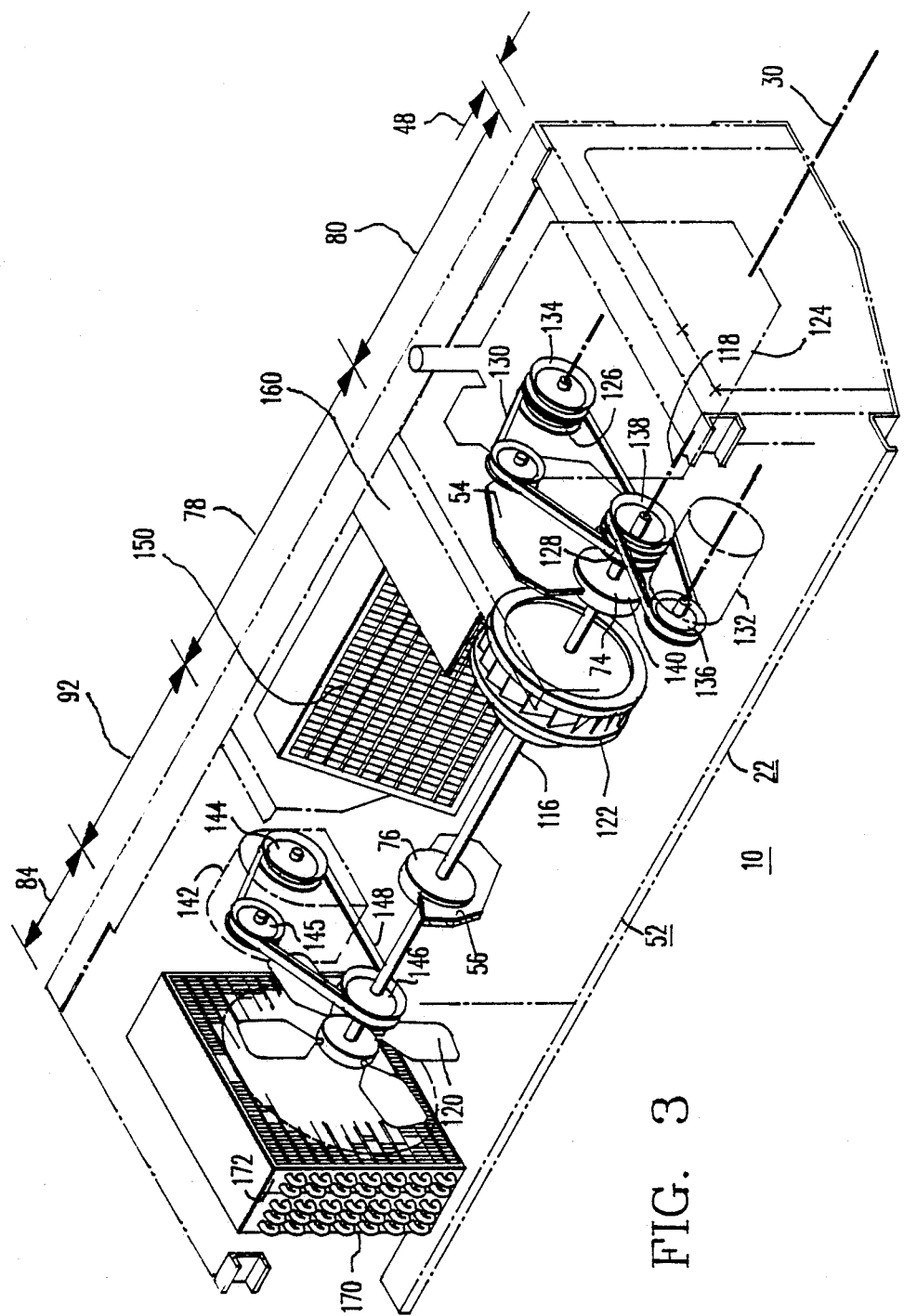
FIG. 3 illustrates the location of major unit components on the frame shown in FIG. 2, with the frame being shown mostly in phantom, and with the power shaft, related driving and driven pulleys, and air movers being shown in solid.

Referring now to the drawings, and to FIG. 1 in particular, there is shown a transport refrigeration unit 10 constructed according to the teachings of the invention, mounted on the front wall 12 of a straight truck 14. Truck 14 includes a cab 16, which may tilt forward for service, and a cargo space 18 which is to be conditioned by transport refrigeration unit 10.

As will be hereinafter explained in detail, transport refrigeration unit 10 is a completely self contained unit, unlike many straight truck units, with all refrigeration components and prime movers, including an internal combustion engine and an optional standby electrical motor, mounted within unit 10. Further, as illustrated in FIG. 1, unit 10 is mounted up at the roofline 20 of the truck 14, with a profile dimensioned to provide tilt cab clearance, and the unit 10 does not intrude into the cargo space 18, maximizing payload capacity.

Referring now to FIG. 2, there is shown an elongated metallic frame 22 constructed to provide a component layout and airflow path which enables a 12,000 BTU/hr transport refrigeration unit for straight trucks to be completely self contained and still meet the requirement of being zero cube. Frame 22, when provided with a cover 24, best shown in FIGS. 4 and 5, has a profile which is only 20 inches high (50.8 cm), 29.8 inches deep (75.69 cm), and 77 inches long (195.58 cm). The depth, measured along the bottom of the unit, is only 11.4 inches (28.95 cm) perpendicular to wall 12, at which point the profile is raised 17 degrees from the horizontal, to accommodate tilt cabs. Cover 24 defines a top 25, front 27, bottom 29, and first and second sides 31 and 33, respectively, of transport refrigeration unit 10.

Frame 22, which is preferably formed of aluminum subcomponents welded together, has first and second ends 26 and 28, a longitudinal axis 30 which extends between its ends, a front portion 32, and a back portion 34. Frame 22 includes a base or bottom portion 36 having first and second ends 35 and 37 at the first and second ends 26 and 28 of frame 22, respectively. Base 36 extends from the front 32 to the back or rear 34 of frame 22, starting with an inverted U-shaped configuration 38 at the front 32. Configuration 38 includes a first depending leg 39 which forms a front edge of base 36, a bight 41, and a second depending leg 43. Base 36 then continues towards the back 4 of frame 22 with an inclined portion 40 which angles downwardly at a 17 degree angle from the horizontal, a horizontally oriented lowermost portion 42, and an upturned flange 44 which forms the back of base 36.

Figure 5:
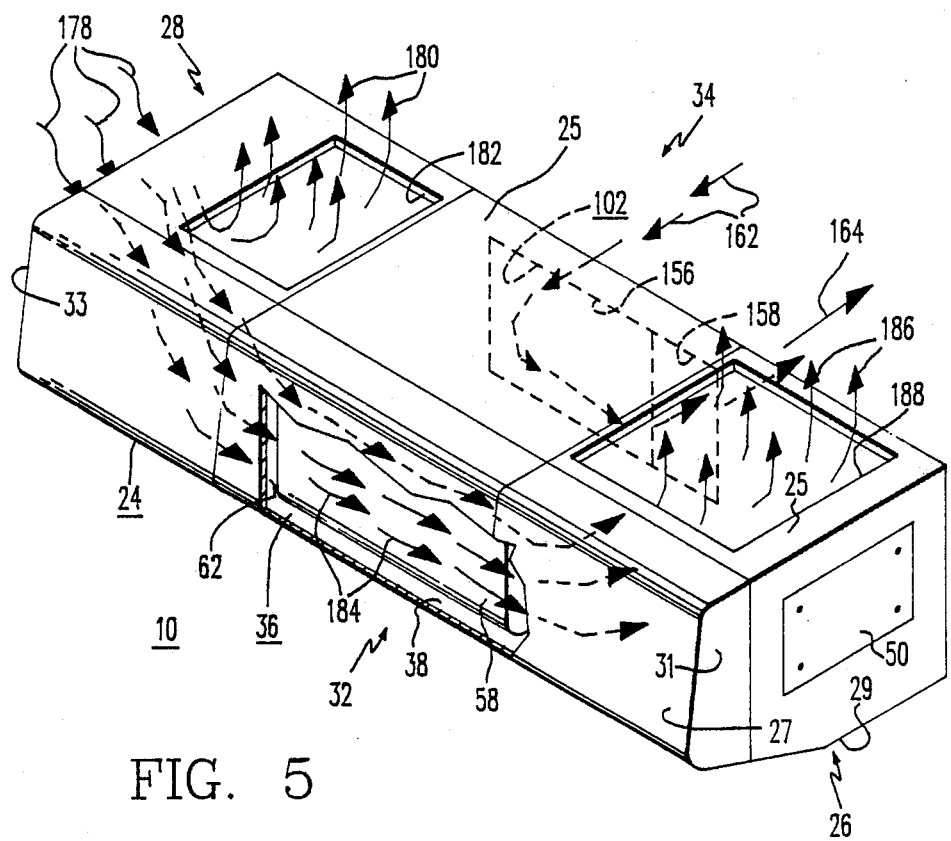
FIG. 5 is a perspective view of the transport refrigeration unit shown in FIGS. 1 through 4, shown partially cut away, illustrating air flow paths defined by the unit.

A first upstanding side 46 of frame 22 is welded to base 36 at the first end 26 of frame 22. The first upstanding side 46 has a longitudinal depth which defines a control section 48 of the frame 22. Control elements mounted in control section 48 are accessible via a removable service panel 50 in cover 24, as shown in FIG. 5.

An intermediate frame structure 52 having first, second and third upstanding wall portions 54, 56 and 58, respectively, is welded to base 36. Intermediate frame structure 52 defines a U-shaped configuration in horizontal cross section, with the first and second upstanding wall portions 54 and 56 being leg portions of the U-shaped configuration, which are disposed in spaced parallel relation with the first upstanding side 46. In other words, major flat surfaces defined by wall portions 54 and 56 are perpendicular to longitudinal axis 30. The third upstanding wall portion 58 forms a bight of the U-shaped configuration, and it extends along the front 32 of frame 22, in predetermined spaced relation from leg 39 which defines the foremost edge of base 36. Thus, when cover 24 is disposed on frame 22, the predetermined spaced relation results in wall 58 and cover 24 cooperatively forming an air passageway 62, shown in FIG. 5, for purposes which will be hereinafter explained. The uppermost edges of upstanding wall portions 54, 56 and 58 may be inwardly flanged, such as flange 64 on wall 56, and the free ends of wall portions 54 and 56 may be outwardly flanged into the plane of the back portion 34 of frame 22, such as flanges 66 and 68. The first and second upstanding wall portions 54 and 56 define openings 70 and 72 for receiving bearings 74 and 76, respectively, shown in FIG. 3.

The first, second and third upstanding wall portions 54, 56 and 58 define an evaporator section 78, and the first upstanding wall portion 54 is spaced from the first upstanding side 46 to define a prime mover section 80 between them.

A second upstanding side 82 of frame 22 is welded to base 36 at the second axial end 28. The second upstanding side 82 has a depth dimension which defines a condenser section 84 at the second end, and it includes an inner wall 86 having an opening 88 therein which functions as a condenser fan shroud 90. The inner wall 86 is spaced from the second upstanding wall 56 of the intermediate frame structure 52 to define a compressor section 92, which section also houses most of the remaining refrigeration system components. A compressor mounting base (not shown) is welded to frame base 36 in compressor section 92, adjacent to the back or rear portion 34 of frame 22.

A rear upper or top member 94 is welded to the first and second upstanding sides 46 and 82, respectively, and to the upstanding wall portions 54 and 56 of the intermediate frame structure 52, to tie these frame elements together and define an upper rear portion of the frame 22. Rear top member 94 is essentially channel shaped, having an inverted U-shaped configuration which includes a bight 96 and inner and outer depending leg portions 98 and 100, respectively, which have varying dimensions across the longitudinal length of the member to cooperatively define an evaporator opening 102 with the upturned flange 44 of base 36 and the first and second upstanding wall portions 54 and 56 of intermediate frame structure 52.

A front upper or top member 104 is welded to the first and second upstanding sides 46 and 82, respectively, and to the upstanding wall portion 58 of the intermediate frame structure 52, to tie these frame elements together and define an upper front portion of the frame 22. Front top member 104 is essentially channel shaped, having a vertically oriented bight 106 and upper and lower outwardly extending leg portions 108 and 110, respectively.

An upper engine mount 112 and an electric motor mounting plate or base 114 are welded in the prime mover section 80, to complete frame 22.

As shown in FIG. 3, a power shaft 116 having a longitudinal axis 118 is mounted in the hereinbefore mentioned bearings 74 and 76 which are supported by upstanding wall portions 54 and 56, respectively. Bearing 74 fixes the axial position of shaft 116, while bearing 76 is a slidable bearing, accommodating dimensional changes in shaft 116 due to changes in temperature in the evaporator section 78. In addition to extending through the evaporator section, shaft 116, which has its axis 118 disposed in parallel relation with the longitudinal axis 30 of frame 22, also extends outwardly in one direction into the prime mover section 80, and outwardly in the other direction through the compressor section 92 and into the condenser section 84.

Condenser and evaporator air mover means 120 and 122, respectively, are directly mounted on power shaft 116. The condenser air mover means 120 is in the form of an axial flow fan in the preferred embodiment. The evaporator air mover means 122 must be a centrifugal blower in order to achieve the object of the invention related to good air flow through the cargo space 18 and its associated load. In the preferred embodiment of the invention, centrifugal blower 122 is a backward incline blower, as a backward incline blower provides maximum air velocity and the desired airflow through cargo space 18 and its load with very low reduction in performance as static pressure increases. While a backward straight centrifugal fan wheel will perform adequately, performance is further enhanced by using a backward curved centrifugal fan wheel.

The prime mover section 80 includes an internal combustion engine 124, preferably a Diesel engine, which is belted to power shaft 116 via a pulley 126 on engine 124, an idler pulley 127, a pulley 128 on power shaft 116, and a belt 130. If the prime mover section 80 is provided with the option of having an electrical standby motor 132, engine 124 is coupled to pulley 126 via a centrifugal clutch 134 which couples engine 124 with pulley 126 only when engine 124 is operating. Standby motor 132 is also belted to power shaft 116 via pulleys 136 and 138 on motor 132 and power shaft 116, respectively, and a belt 140.

A refrigerant compressor 142 is also belted to power shaft 116, via a pulley 144 on compressor 142, a pulley 145 which drives an alternator, a pulley 146 on power shaft 116, and a belt 148.

An evaporator 150 is disposed in evaporator section 78, with the evaporator 150 having its major air intake and air outlet faces inclined from the vertical to allow more air intake and air outlet surface in a given space. As shown in FIG. 5, evaporator opening 102 in the rear 34 of transport refrigeration unit 10 is divided into first and second portions 156 and 158, with opening 156 being in registry with evaporator 150 and with opening 158 being in registry with an air plenum 160 which directs conditioned air into cargo space 18.

As shown in FIG. 5, air from cargo space 18, indicated by arrows 162 is drawn into opening 156 and through evaporator 150 by blower 122. Blower 122 discharges the air which has just been drawn through evaporator 150 back into cargo space 18 via opening 158, with the conditioned air being indicated by arrows 164.

Figure 4:
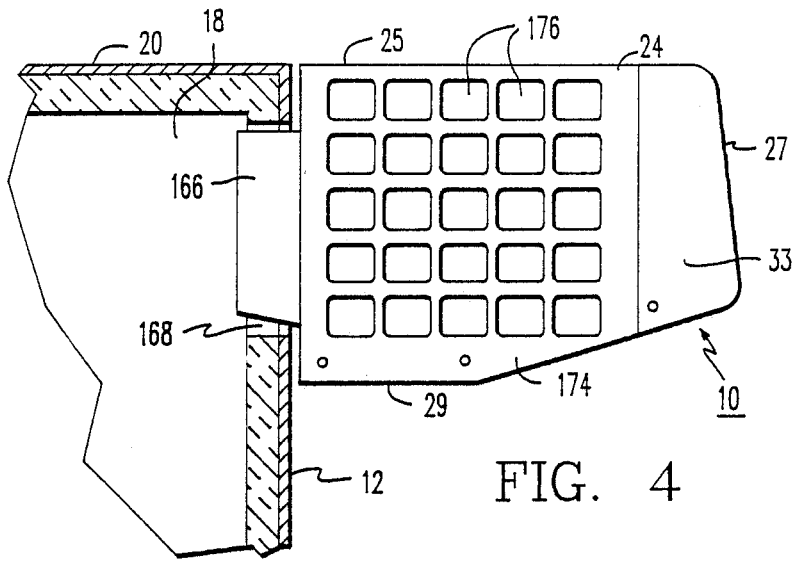
FIG. 4 is a side elevational view of the transport refrigeration unit shown in FIGS. 1 through 2, illustrating the only air intake location of the unit.

As illustrated in FIG. 4, air ducts and evaporator apparatus, indicated generally at 166, extend into truck wall opening 168, but not beyond the inner surface of wall 12, making transport refrigeration unit 10 a truly zero cube unit.

A condenser 170 is disposed in the condenser section 84, with the uppermost tubes, indicated at 172, being the radiator for engine 124. The major air intake and air outlet surfaces of condenser 170 are perpendicularly oriented, with the intake surface being disposed at the second side 33 of the transport refrigeration unit 10. When cover 24 is disposed on frame 22, a removable access panel 174 covers the condenser 170, with panel 174 having a plurality of openings 176 through which air, indicated by arrows 178, is drawn by condenser fan 120.

As shown in FIG. 5, the only air entranceway into transport refrigeration unit 10 for cooling the condenser 170 and radiator 172, as well as for cooling the prime mover section 80, is through the second side 33 of unit 10. Intake air 178 is drawn through condenser 170 and radiator 172 into the compressor section 92 where it is discharged vertically upward, indicated by arrow 180, via an opening 182 in cover 24 located in the top 25 of unit 10, over the compressor section 92. A portion of the air drawn into the compressor section 92, indicated by arrows 184, is also directed into the air passageway 62 defined by the spacing between cover 24 and the third upstanding wall portion 58 of the intermediate frame structure 52. Air 184 is directed into the prime mover section 80 where it flows over motor 132 and engine 124, before being discharged vertically upward, indicated by arrows 186, via an opening 188 in cover 24 located in the top 25 of unit 10, over the prime mover section 80.

In summary, the laterally spaced sections of transport refrigeration unit 10, the single axially extending power shaft 116, the direct mounting of the air handling equipment, and the belting of the prime movers and compressor, all contribute to a component layout and arrangement which achieves a low height profile of a completely self contained zero cube transport refrigeration unit. Further, the disclosed air flow arrangement wherein all of the cooling air enters one axial end of the unit and is discharged upwardly from the top of the unit 10 via openings 182 and 188 in cover 24, minimizes noise at street level.

We claim as our invention:

1. A zero cube transport refrigeration unit suitable for a straight truck, comprising:
   an elongated metallic frame having first and second ends and a longitudinal axis which extends between said ends,
   said frame defining laterally spaced prime mover, evaporator, compressor and condenser sections disposed in the recited order from the first to the second end of said frame,
   an internal combustion engine in said prime mover section,
   an evaporator completely disposed within said evaporator section,
   a compressor in said compressor section,
   a condenser in said condenser section,
   a single power shaft common to all of said sections, extending from the prime mover section to the condenser section, through said evaporator and compressor sections,
   air mover means directly mounted on said power shaft,
   first belt means coupled between said internal combustion engine and said power shaft, to drive said power shaft,
   and second belt means coupled between said power shaft and said compressor, to drive said compressor.

2. The transport refrigeration unit of claim 1 wherein the includes a base, first and second upstanding sides fixed to said base at the first and second ends, respectively, of the frame, and an intermediate frame structure having first, second and third upstanding wall portions fixed to said base,
   said first upstanding side defining a refrigeration control section,
   said second upstanding side defining the condenser section and a condenser fan shroud,
   said base having first and second ends at the first and second ends of said frame, respectively, a front edge, and a back,
   said first, second and third wall portions defining a U-shaped configuration in horizontal cross section in which the first and second upstanding wall portions are leg portions of the U-shaped configuration which are disposed in spaced parallel relation with the first and second upstanding sides, and the third upstanding wall portion is a bight of said U-shaped configuration which is disposed in spaced relation with the front edge of said base,
   and front and rear upper members which tie said first and second upstanding sides and the intermediate frame structure together, to define upper front and upper rear portions of the frame, respectively,
   said intermediate frame structure defining the evaporator section,
   said first upstanding wall portion and said first upstanding side being spaced to define the prime mover section,
   and the fan shroud of said second upstanding wall portion and said second upstanding side being spaced to define the compressor section.

3. The transport refrigeration unit of claim 1 including a cover on said frame which defines top, front, bottom and first and second sides of the transport refrigeration unit.

4. The transport refrigeration unit of claim 2 wherein the evaporator is in air flow communication with an opening defined by the first and second wall portions of the intermediate frame structure, the back of the frame base, and the rear upper frame member.

5. The transport refrigeration unit of claim 2 including first and second bearings supported by the first and second wall portions of the intermediate frame member, with the power shaft being supported by said first and second bearings.

6. The transport refrigeration unit of claim 5 wherein one of the first and second bearings is a fixed bearing which longitudinally fixes the location of the power shaft, and the remaining bearing is a slidable bearing which accommodates expansion and contraction of the power shaft with changes in temperature in the evaporator section.

7. The transport refrigeration unit of claim 1 wherein the air mover means includes a centrifugal blower directly mounted on the power shaft in the evaporator section, and an axial flow fan directly mounted on the power shaft in the condenser section.

8. The transport refrigeration unit of claim 1 wherein the internal combustion engine includes a centrifugal clutch, and including an electric motor and third belt means in the prime mover section, with said third belt means coupling said electric motor to said power shaft, to enable said electric motor to drive the power shaft when the internal combustion engine is not engaged with the power shaft via said centrifugal clutch.

9. The transport refrigeration unit of claim 1 including a cover on the frame which defines top, front, bottom, and first and second sides of the transport refrigeration unit, said cover defining an air entranceway opening into the condenser section at said second side of the transport refrigeration unit, and air exit openings from the compressor and prime mover sections in the top of the transport refrigeration unit, while closing other external openings to the prime mover section to direct prime mover generated noise upwardly, and wherein the cover and frame cooperatively define an air passageway which interconnects the compressor section and prime mover section, to enable air entering the air entranceway to exit through both of said air exit openings on the top of the transport refrigeration unit.

10. The transport refrigeration unit of claim 2 including a cover on the frame which defines top, front, bottom, and first and second sides of the transport refrigeration unit, said cover defining an air entranceway opening into the condenser section at said second side of the transport refrigeration unit, and air exit openings from the compressor and prime mover sections in the top of the transport refrigeration unit, while closing other external openings to the prime mover section to direct prime mover generated noise upwardly, and wherein the cover and third upstanding wall portion of the intermediate frame structure cooperatively define an air passageway which interconnects the compressor section and prime mover section, to enable air entering the air entranceway to exit through both of said air exit openings on the top of the transport refrigeration unit.

11. The transport refrigeration unit of claim 1 wherein the air mover means includes a backward incline centrifugal blower disposed to draw air from a space to be conditioned, and to discharge evaporator conditioned air back into the space to be conditioned.

12. The transport refrigeration unit of claim 11 wherein the backward incline centrifugal blower is backward curved.

* * * * *